United States Patent Office 3,232,980
Patented Feb. 1, 1966

3,232,980
PREPARATION OF AMINO-(NITROBENZAMIDO) BENZENESULFONIC ACIDS
Webster A. Shultis, Jr., Castleton on Hudson, and Orville G. Shanholtzer, Nassau, N.Y., assignors to General Aniline & Film Corporation, New York, N.Y., a corporation of Delaware
No Drawing. Filed Dec. 22, 1961, Ser. No. 161,431
11 Claims. (Cl. 260—507)

The present invention is directed to an improved process for the monoacylation of a diaminoarylsulfonic acid with nitrobenzoyl chloride, and more particularly is directed to an improved process for preparing amino-(nitrobenzamido)benzenesulfonic acids.

Heretofore, aqueous acylations, in which acyl chlorides have been employed as the acylating agent, have been carried out in the presence of acid-binding agents, such as for example, sodium acetate, sodium carbonate, magnesium oxide and tertiary bases, including such compounds as pyridine and dimethyl aniline. In one instance, it has been reported in a method wherein 3,5-diamino-p-toluenesulfonic acid was acylated in an aqueous alkaline solution employing sodium carbonate as the acid-binding agent, there was obtained a 30 percent yield of the product, 3-amino-5-(m-nitrobenzamido)-p-toluenesulfonic acid. The products produced according to this method, wherein an acid-binding agent is employed, are usually of a low degree of purity which makes the processes for their production normally commercially unattractive for their subsequent use in other fields of utility.

Thus, it is an object of this invention to provide an economically attractive process for the reaction of a diamino-arylsulfonic acid with nitrobenzoyl chloride wherein there is provided a high yield of product and which product has a high degree of purity.

The attainment of the above object of the invention is based on our discovery that, if the reaction between a diamino-arylsulfonic acid and nitrobenzoyl chloride is carried out in an acid medium, there is provided a manifold increase in the yield of product normally obtained over the prior art methods of acylation referred to above.

The sulfonic acids which can be prepared in accordance with the process of this invention can be conveniently characterized by the general formula:

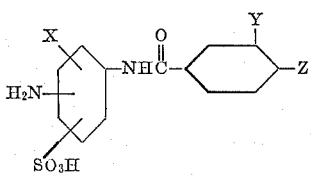

wherein X represents members selected from the group consisting of hydrogen and methyl and Y and X represent members selected from the group consisting of hydrogen and nitro groups with at least one of Y and Z representing a nitro group.

Representative nitrobenzoyl chlorides which can be employed with facility in the process of the invention include metanitrobenzoyl chloride and para-nitrobenzoyl chloride.

Typical sulfonic acids which deserve special mention for use in the process of the invention include 2,4-diaminobenzenesulfonic acid; 2,5-diaminobenzenesulfonic acid; 3,5-diaminobenzenesulfonic acid; 3,5-diamino-p-toluenesulfonic acid; 3,5-diamino-o-toluenesulfonic acid; 4,6-diamino-m-toluenesulfonic acid, and the like.

While stoichiometric proportions of the two reactants are required, as illustrated by the following representative equation:

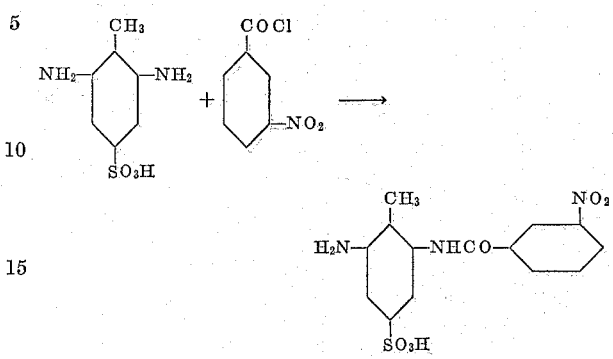

and the use of these proportions of reactants is preferred, an excess of either reactant can also be employed. When it is desired to employ an excess of nitrobenzoyl chloride however, it is preferred that up to 10 percent excess of nitrobenzoyl chloride be employed in the process of the invention.

The reaction between the diaminobenzenesulfonic acid and nitrobenzoyl chloride proceeds smoothly at temperatures in the range of from 20 to about 70° C. It is preferred however, that the reaction be carried out at temperatures of from about 30° C. to about 50° C. so that the reaction time, in this case, can vary from about 2 to about 10 hours.

The acid medium employed in carrying out the reaction according to the process of the invention can be any strong acid such as hydrochloric acid, sulfuric acid, phosphoric acid and the like.

In carrying out the process of this invention, a diaminoarylsulfonic acid is acylated in an aqueous slurry in strongly congo acid medium wherein one mol of a selected diaminoarylsulfonic acid is reacted with from 1 mol up to an excess of 10 percent of nitrobenzoyl chloride, in an aqueous solution which contains from about 0.3 to about 0.8 mol of acid such as those enumerated above.

The product of the reaction precipitates out of the reaction medium as the reaction proceeds. The product is then filtered and washed in the usual manner.

The following examples will serve to illustrate the practice of the process of the invention and are not to be construed as limitative of such except as necessitated by the appended claims.

EXAMPLE 1

*Preparation of 3-amino-5-(m-nitrobenzamido)-p-toluenesulfonic acid*

To 2500 cc. of water there is added 151.5 grams of 3,5-diamino-p-toluenesulfonic acid with stirring. After a period of 10 minutes, 150 grams of m-nitrobenzoyl chloride and 43.5 grams of hydrochloric acid (20 Be′.) are added simultaneously and under conditons of agitation to the mixture of the sulfonic acid and water. The temperature of the mixture is adjusted to a temperature in the range of from 30° C. to 35° C. and stirring is continued for a period of 4 hours at this temperature whereupon the charge is filtered and dried well. The filter cake is then washed with portions employing 1800 cc. of water at a temperature of 30–35° C. by alternative soaking and subsequent dehydration. After the washing is complete, the filter cake is dried and there was obtained a 90 percent yield of product, 3-amino-5-(m-nitrobenzamido)-p-toluenesulfonic acid.

EXAMPLE 2
*Preparation of 2-amino-4-(m-nitrobenzamido) benzenesulfonic acid*

In a manner similar to Example 1, 139 grams of 2,4-diaminobenzenesulfonic acid are condensed with 15 grams of m-nitrobenzoyl chloride to give the product, 2-amino-4-(m-nitrobenzamido)benzenesulfonic acid.

What is claimed is:
1. The process for producing an amino-(nitrobenzamido)benzenesulfonic acid which comprises reacting a diaminobenzene-sulfonic acid and a nitrobenzoyl chloride in an amount of 1–1.1 moles of nitrobenzoyl chloride per mole of diaminobenzenesulfonic acid under aqueous conditions at a temperature in the range of from 20° C.–70° C. for a period of from 2–10 hours in the presence of from 0.3–0.8 mole of a strong inorganic acid.
2. The process according to claim 1 wherein the temperature is in the range of from 30° C.–50° C.
3. The process according to claim 1 wherein the strong acid is hydrochloric acid.
4. The process according to claim 1 wherein the strong acid is phosphoric acid.
5. The process according to claim 1 wherein the strong acid is sulfuric acid.
6. The process according to claim 1 wherein the diaminoarylsulfonic acid is 2,4-diaminobenzenesulfonic acid.
7. The process according to claim wherein the diaminoarylsulfonic acid is 2,5-diaminobenzenesulfonic acid.
8. The process according to claim 1 wherein the diaminoarylsulfonic acid is 3,5-diaminobenzenesulfonic acid.
9. The process according to claim 1 wherein the diaminoarylsulfonic acid is 3,5-diamino-p-toluenesulfonic acid.
10. The process according to claim 1 wherein the diaminoarylsulfonic acid is 4,6-diamino-m-toluenesulfonic acid.
11. The process according to claim 1 wherein the diaminoarylsulfonic acid is 3,5-diamino-o-toluenesulfonic acid.

References Cited by the Examiner
UNITED STATES PATENTS

| | | | |
|---|---|---|---|
| 994,420 | 6/1911 | Neelmeier | 260—510 |
| 1,891,159 | 12/1932 | Hooley et al. | 260—510 |

OTHER REFERENCES

Franzen: Ber. Deut. Chem., vol. 42, 1909, pages 2465–8.

Moller: Methoden der Organischen Chemie, vol. XI/2, 1958, pages 10–14 (pages 13,14 relied upon).

Shriner et al.: The Systematic Identification of Organic Compounds, 4th edition, 1956, pp. 98–99.

LORRAINE A. WEINBERGER, *Primary Examiner.*

LEON ZITVER, *Examiner.*